(12) United States Patent
Cho et al.

(10) Patent No.: US 12,542,045 B2
(45) Date of Patent: Feb. 3, 2026

(54) ELECTRONIC DEVICE AND LOSS REPORTING METHOD THEREFOR

(71) Applicant: SAMSUNG ELECTRONICS CO., LTD., Suwon-si (KR)

(72) Inventors: Junwan Cho, Suwon-si (KR); Doosuk Kang, Suwon-si (KR); Sangchul Yun, Suwon-si (KR); Gyujin Lee, Suwon-si (KR); Jubyung Lee, Suwon-si (KR); Wonkyoung Jang, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 109 days.

(21) Appl. No.: 18/241,197

(22) Filed: Aug. 31, 2023

(65) Prior Publication Data

US 2023/0410633 A1 Dec. 21, 2023

Related U.S. Application Data

(63) Continuation of application No. PCT/KR2022/001913, filed on Feb. 8, 2022.

(30) Foreign Application Priority Data

Mar. 12, 2021 (KR) ........................ 10-2021-0032879

(51) Int. Cl.
*G08B 21/24* (2006.01)
*H04W 4/029* (2018.01)
*H04W 8/22* (2009.01)

(52) U.S. Cl.
CPC ............ *G08B 21/24* (2013.01); *H04W 4/029* (2018.02); *H04W 8/22* (2013.01)

(58) Field of Classification Search
CPC ........ G08B 21/24; H04W 4/029; H04W 8/22; H04W 4/80; H04W 8/00; H04W 8/005; H04W 8/24; H04W 88/02; Y02D 30/70
See application file for complete search history.

(56) References Cited

U.S. PATENT DOCUMENTS 8,768,306 B1* 7/2014 Ben Ayed ........... H04W 12/069
455/411
9,338,638 B1* 5/2016 Palin ..................... H04W 12/37
(Continued)

FOREIGN PATENT DOCUMENTS

EP 3989612 A1 4/2022
JP 4282218 B2 3/2009
(Continued)

OTHER PUBLICATIONS

Korean Office Action corresponding to Application No. 10-2021-0032879; Dated Nov. 18, 2025.

*Primary Examiner* — Curtis J King
(74) *Attorney, Agent, or Firm* — CANTOR COLBURN LLP

(57) ABSTRACT

An electronic device includes a communication circuit, a memory, and a processor operatively connected to the communication circuit and the memory. The processor can be configured to: transmit, through the communication circuit, an advertisement packet having a first attribute; check, on the basis of identification information stored in the memory, whether a scan request packet is received from an external electronic device corresponding to the identification information; and transmit, through the communication circuit, an advertisement packet having a second attribute including loss notification information, if the scan request packet is not received from the external electronic device.

17 Claims, 8 Drawing Sheets

(56) References Cited

U.S. PATENT DOCUMENTS

| | | | |
|---|---|---|---|
| 9,538,356 B2* | 1/2017 | Hughes | H04W 8/005 |
| 10,039,074 B1* | 7/2018 | Sargent | G01S 5/28 |
| 10,887,759 B1* | 1/2021 | Wang | H04W 4/80 |
| 11,043,086 B1* | 6/2021 | Daoura | G08B 21/24 |
| 11,197,347 B2 | 12/2021 | Park et al. | |
| 11,509,986 B1* | 11/2022 | Parampottil | G06F 3/165 |
| 2006/0014562 A1* | 1/2006 | Syrtsov | H04L 41/0893 |
| | | | 455/556.2 |
| 2006/0116146 A1* | 6/2006 | Herrod | H04L 41/00 |
| | | | 455/418 |
| 2006/0205401 A1* | 9/2006 | Palin | H04W 72/1215 |
| | | | 455/425 |
| 2011/0084807 A1* | 4/2011 | Logan | H04W 4/029 |
| | | | 340/10.1 |
| 2014/0191868 A1* | 7/2014 | Ortiz | H04W 12/126 |
| | | | 340/539.13 |
| 2014/0221003 A1* | 8/2014 | Mo | H04W 64/00 |
| | | | 455/456.1 |
| 2014/0254466 A1 | 9/2014 | Wurster et al. | |
| 2015/0181370 A1* | 6/2015 | French | H04W 12/126 |
| | | | 455/456.6 |
| 2015/0319674 A1* | 11/2015 | Hughes | H04W 52/0209 |
| | | | 455/41.2 |
| 2015/0327001 A1* | 11/2015 | Kirshenberg | H04W 4/80 |
| | | | 455/41.2 |
| 2016/0006577 A1* | 1/2016 | Logan | H04W 4/80 |
| | | | 700/276 |
| 2016/0183282 A1* | 6/2016 | Balaban | H04W 72/54 |
| | | | 370/329 |
| 2016/0314681 A1* | 10/2016 | Zhijian | H04W 4/02 |
| 2017/0084151 A1* | 3/2017 | Beaty | G08B 21/0227 |
| 2017/0201857 A1 | 7/2017 | De La Broise | |
| 2017/0352251 A1 | 12/2017 | De Barros Chapiewski et al. | |
| 2018/0035264 A1 | 2/2018 | Farley et al. | |
| 2018/0048673 A1* | 2/2018 | Hunt | H04L 63/08 |
| 2018/0082142 A1* | 3/2018 | Han | H04N 5/77 |
| 2018/0121828 A1* | 5/2018 | Keysers | G06N 5/04 |
| 2018/0152806 A1* | 5/2018 | Zhang | G08B 21/0277 |
| 2018/0152979 A1* | 5/2018 | Lee | H04W 8/005 |
| 2018/0180752 A1* | 6/2018 | Gabai | G01V 1/001 |
| 2018/0279103 A1* | 9/2018 | Hong | H04W 76/19 |
| 2018/0352377 A1* | 12/2018 | Schwarzer | H04W 4/023 |
| 2019/0001863 A1* | 1/2019 | Taylor | H04W 4/70 |
| 2019/0090082 A1* | 3/2019 | Ganton | G06Q 10/08 |
| 2019/0147729 A1* | 5/2019 | Ghazal | G08B 3/10 |
| | | | 340/539.13 |
| 2019/0246257 A1* | 8/2019 | Hasegawa | H04W 4/80 |
| 2019/0253857 A1 | 8/2019 | Li et al. | |
| 2019/0319685 A1* | 10/2019 | Chen | H04B 1/401 |
| 2019/0335398 A1* | 10/2019 | Wang | H04W 80/04 |
| 2020/0084833 A1* | 3/2020 | Kwan | H04B 17/382 |
| 2020/0128482 A1* | 4/2020 | Daoura | H04W 4/80 |
| 2020/0227160 A1* | 7/2020 | Youngblood | G16H 40/20 |
| 2020/0337162 A1* | 10/2020 | Perkins | G04G 17/04 |
| 2020/0404610 A1 | 12/2020 | Crouch et al. | |
| 2021/0029528 A1 | 1/2021 | Huang et al. | |
| 2021/0076787 A1* | 3/2021 | Farrer | A44C 5/0007 |
| 2022/0062621 A1* | 3/2022 | Hogg | A61N 1/36014 |
| 2022/0230529 A1* | 7/2022 | Cruver | G08B 25/014 |
| 2022/0280747 A1* | 9/2022 | Shouldice | A61M 21/02 |
| 2022/0301410 A1* | 9/2022 | Erdmann, IV | H04W 4/021 |
| 2022/0360942 A1* | 11/2022 | Xue | H04W 4/02 |
| 2022/0360945 A1 | 11/2022 | Lopatin et al. | |
| 2023/0131370 A1* | 4/2023 | Gorski | A01K 29/005 |
| | | | 340/573.1 |
| 2024/0187992 A1* | 6/2024 | Tang | H04W 52/0241 |
| 2024/0334194 A1* | 10/2024 | Vattakulla | H04W 12/50 |

FOREIGN PATENT DOCUMENTS

| | | |
|---|---|---|
| JP | 2013258650 A | 12/2013 |
| JP | 6282574 B2 | 2/2018 |
| KR | 19980033745 A | 7/1998 |
| KR | 100664726 B1 | 1/2007 |
| KR | 100727614 B1 | 6/2007 |
| KR | 20120008555 A | 2/2012 |
| KR | 101631603 B1 | 6/2016 |
| KR | 20160105154 A | 9/2016 |
| KR | 20200017302 A | 2/2020 |
| KR | 20200079252 A | 7/2020 |
| KR | 20200144759 A | 12/2020 |
| KR | 102447351 B1 | 9/2022 |

* cited by examiner

ELECTRONIC DEVICE AND LOSS REPORTING METHOD THEREFOR

CROSS-REFERENCE TO RELATED APPLICATIONS

This application is a continuation application, under 35 U.S.C. § 111(a), of International Patent Application No. PCT/KR2022/001913, filed on Feb. 8, 2022, which claims priority to Korean Patent Application No. 10-2021-0032879, filed on Mar. 12, 2021, the content of which in its entirety is herein incorporated by reference.

TECHNICAL FIELD

Various embodiments disclosed in this document relate to an electronic device and a loss reporting method therefor, for example, a method of determining whether an electronic device is lost and reporting the loss.

BACKGROUND ART

As electronic devices become smaller in size so as to be easily carried in line with the development of technology, electronic devices may be lost while being carried and used.

If an electronic device is disconnected from a first external electronic device during communication connection therewith, the electronic device may determine itself to be in a loss state and broadcast its own identification information such that a second external electronic device receiving the identification information may transmit the identification information to a server, thereby reporting the loss. In order to track the lost electronic device, the first external electronic device may obtain location information of the second external electronic device and identification information of the lost electronic device from the server.

DISCLOSURE OF INVENTION

Technical Problem

If an electronic device is not consistently connected to the first external electronic device, it may be difficult for the electronic device to determine its own loss state, and the lost electronic device may frequently broadcast its own identification information, causing an increase in power consumption. As another example, overload may occur in the server due to frequent reception of unnecessary information related to the loss state.

The technical problems to be solved in the disclosure are not limited to the above-mentioned technical problems, and other technical problems not mentioned will be clearly understood by those skilled in the art to which the disclosure pertains from the description below.

Solution to Problem

Various embodiments disclosed in this document may provide an electronic device and a loss reporting method for determining the loss state of an electronic device, based on a result of performing a specified operation of determining whether or not the electronic device is lost, and transmitting loss notification information.

An electronic device according to various embodiments disclosed in this document may include a communication circuit, a memory, and a processor operatively connected to the communication circuit and the memory, wherein the processor may be configured to transmit an advertisement packet in a first attribute through the communication circuit, identify, based on identification information stored in the memory, whether or not a scan request packet is received from an external electronic device corresponding to the identification information, and, if no scan request packet is received from the external electronic device, transmit an advertisement packet in a second attribute including loss notification information through the communication circuit.

A method of an electronic device according to various embodiments may include transmitting an advertisement packet in a first attribute, identifying, based on identification information stored in a memory, whether or not a scan request packet is received from an external electronic device corresponding to the identification information, and, if no scan request packet is received from the external electronic device, transmitting an advertisement packet in a second attribute including loss notification information.

Advantageous Effects of Invention

According to various embodiments, an electronic device may determine a loss state of the electronic device, based on a result of performing a specified operation of determining whether or not the electronic device is lost to identify a communication state with a first external electronic device, and transmit loss notification information.

According to various embodiments, an electronic device may adjust transmission of loss notification information depending on various situations.

According to various embodiments, an electronic device may transmit loss notification information through an advertisement packet, thereby reporting a loss to a server without a communication connection with a second external electronic device receiving the loss notification information.

Accordingly, power consumption of the electronic device and/or overhead of the server may be reduced.

In addition, various effects identified directly or indirectly through this document may be provided.

BRIEF DESCRIPTION OF DRAWINGS

In connection with the description of the drawings, the same or similar reference numerals may be used for the same or similar elements.

MODE FOR THE INVENTION

Figure 1:
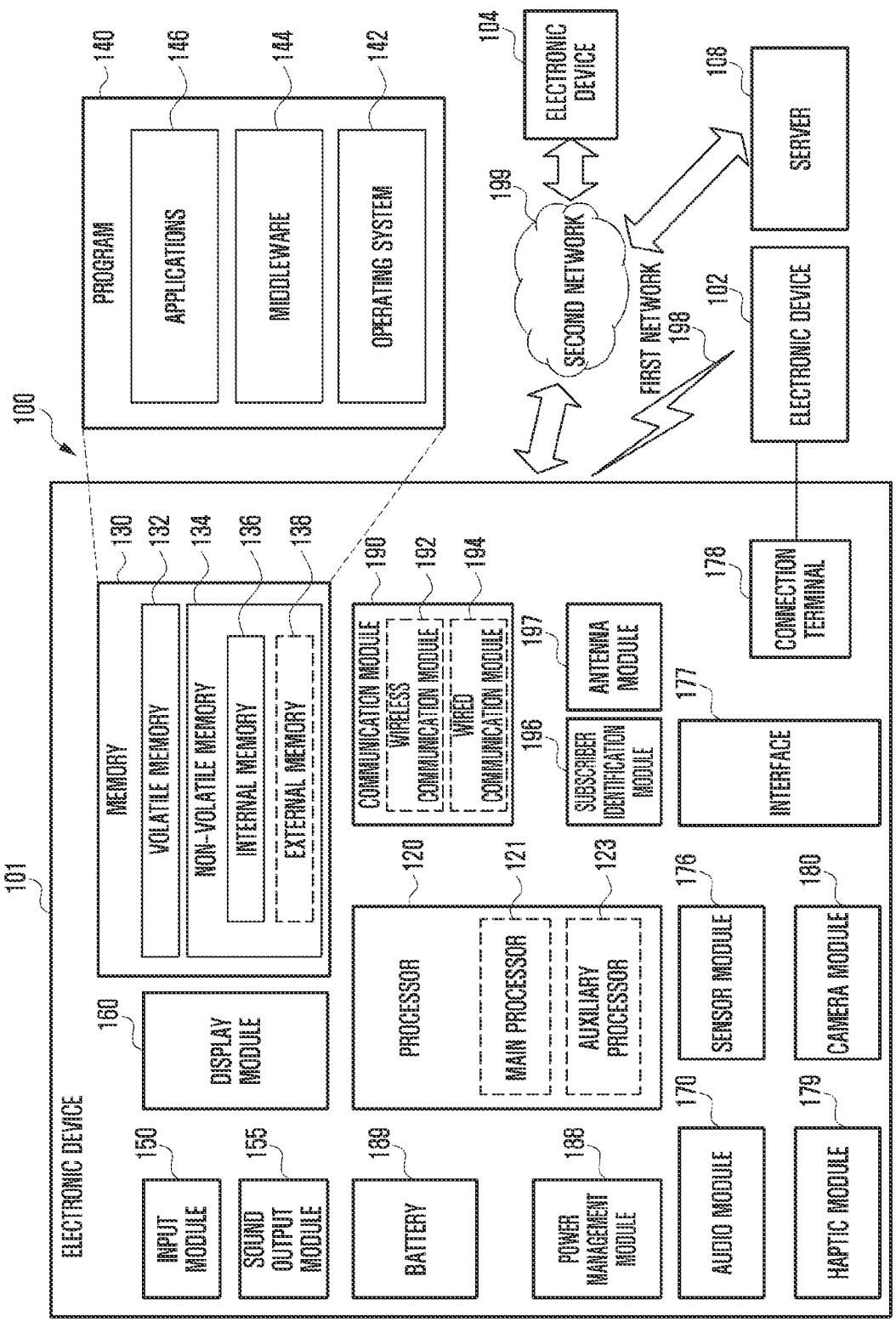
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
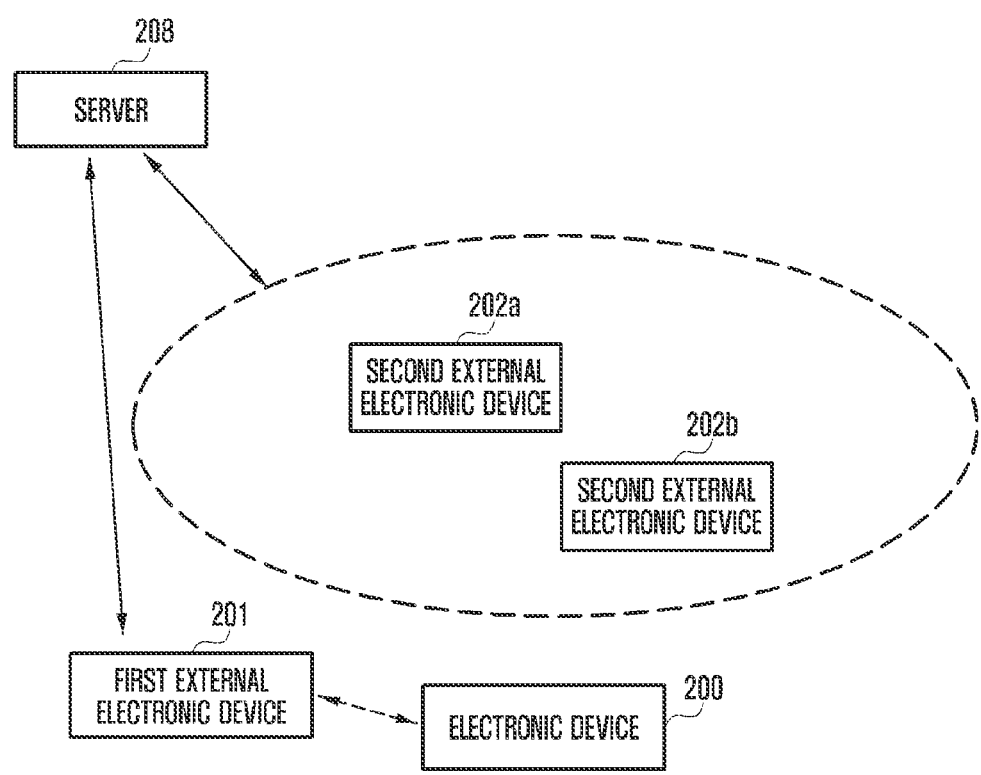
FIG. 2 is a diagram illustrating a communication environment of an electronic device according to various embodiments.

FIG. 2 is a diagram illustrating a communication environment of an electronic device according to various embodiments.

According to various embodiments, the electronic device 200 may be a device that determines its own loss state (hereinafter, referred to as a lost electronic device), based on a communication state with a first external electronic device 201, and broadcasts a packet including loss notification information. For example, the electronic device 200 may include a portable electronic device (e.g., a smartphone or a tablet PC) or a wearable device (e.g., a wireless audio device, a smart watch, or a missing child prevention device) capable of short-distance wireless communication (e.g., Bluetooth or Bluetooth low energy (BLE)). For example, the electronic device 200 may include at least some elements identical or similar to those of the electronic device 101 shown in FIG. 1.

According to various embodiments, the first external electronic device 201 may be a device that determines a loss state of the electronic device 200, based on a communication state with the electronic device 200 and tracks the electronic device 200 through a server 208 (e.g., the server 108 in FIG. 1) to obtain information thereabout. For example, the first external electronic device 201 may include elements identical or similar to those of the electronic device 101 in FIG. 1. For example, the first external electronic device 201 may include a portable electronic device (e.g., a smartphone) capable of communication. For example, communication may include cellular communication or short-range communication. The short-range communication may include, for example, Wi-Fi, Bluetooth (BT), ultra-wide-band (UWB), or BLE.

According to various embodiments, at least one second external electronic device (e.g., at least one of the second external electronic device 202a and the second external electronic device 202b) may be a device that receives a packet broadcast from the electronic device 200 and transmits the packet to the server 208. For example, the second external electronic devices 202a and/or 202b may include elements identical to or similar to those of the electronic device 101 in FIG. 1. For example, the second external electronic devices 202a and/or 202b may include a portable electronic device (e.g., a smartphone) capable of communication.

According to various embodiments, the electronic device 200 may store identification information (e.g., a device unique identifier or a device address) of the first external electronic device 201. For example, the electronic device 200 may receive information including identification information of the first external electronic device 201 through short-range wireless communication with the first external electronic device 201. For example, the first external electronic device 201 may receive identification information (e.g., a device unique identifier or a device address) of the electronic device 200 through short-range wireless communication with the electronic device 200. For example, the electronic device 200 may establish a communication connection with the first external electronic device 201 by transmitting an advertisement packet. For example, the electronic device 200 may transmit a scan response to a scan request, which is received from the first external electronic device 201 after transmitting an advertisement packet, to establish communication connection with the first external electronic device 201. For example, an advertisement packet, a scan request packet, and/or a scan response packet may include identification information of a device (e.g., a device unique identifier or a device address). For example, the electronic device 200 may obtain identification information of the first external electronic device 201 from a scan request packet received from the first external electronic device 201.

Figure 3:
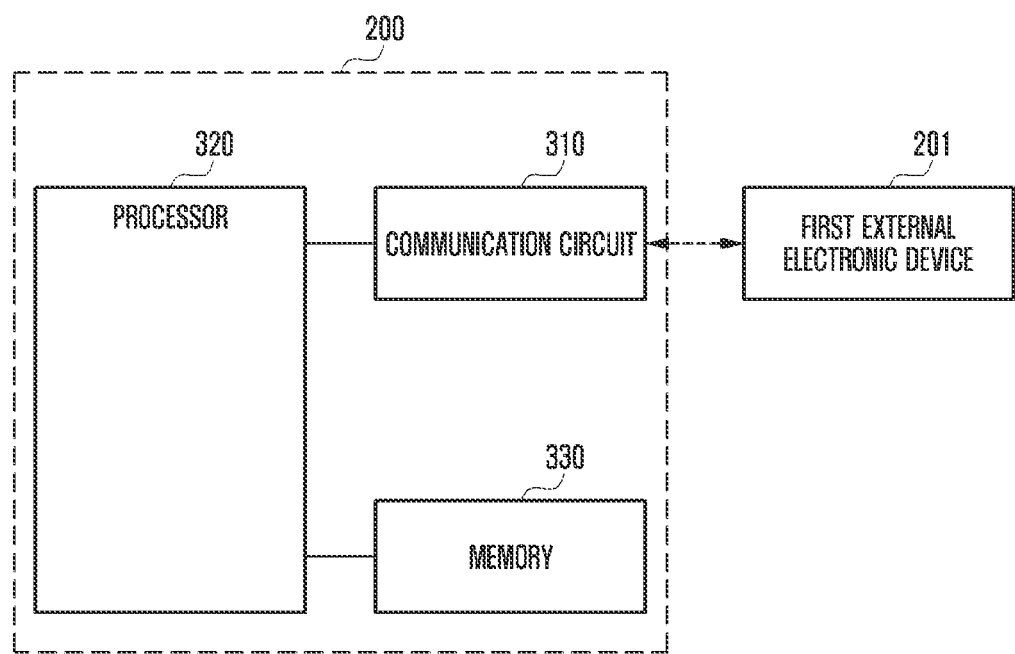
FIG. 3 is a block diagram of an electronic device according to various embodiments.

FIG. 3 is a block diagram of an electronic device (e.g., the electronic device 200 in FIG. 2) according to various embodiments.

According to various embodiments, the electronic device 200 may include a communication circuit 310 (e.g., the communication module 190 in FIG. 1), a processor 320 (e.g., the processor 120 in FIG. 1), and/or a memory 330 (e.g., the memory 130 in FIG. 1). Elements of the electronic device 200 are not limited thereto and the electronic device may further include at least some elements identical or similar to the elements of the electronic device 101 shown in FIG. 1 depending on the configuration. For example, in the case where the electronic device 200 is implemented as a wireless audio device, the electronic device 200 may further include an audio module (e.g., the audio module 170 in FIG. 1), a microphone (e.g., the input module 150 in FIG. 1), and/or a speaker (e.g., the sound output module 155 in FIG. 1).

According to various embodiments, the communication circuit 310 (e.g., the communication module 190 in FIG. 1) may perform wireless communication with an external electronic device (e.g., the first external electronic device 201 or the second external electronic devices 202a and/or 202b in FIG. 2). In an embodiment, the communication circuit 310 may transmit and/or receive a control message and/or data to and/or from the first external electronic device 201 through wireless communication. For example, the wireless communication may include short-range communication such as a wireless local area network (WLAN), Bluetooth, Bluetooth low energy (BLE), UWB, or infrared data association (IrDA).

According to various embodiments, the memory 320 (e.g., the memory 130 in FIG. 1) may store identification information (e.g., a device unique identifier or a device address) of the first external electronic device 201. For example, the memory 320 may store conditions for performing an operation of determining whether or not the electronic device is lost based on a communication state with the first external electronic device 201. For example, the memory 320 may store programs including instructions for determining the loss state of the electronic device 200, based on a result of performing an operation of determining whether or not the electronic device is lost in relation to the communication state with the first external electronic device 201, and transmitting a loss report. For example, the memory 320 may store conditions for broadcasting an advertisement packet including loss notification information.

According to various embodiments, the processor 320 (e.g., the processor 120 in FIG. 1) may control the overall operation of the electronic device 200 and the signal flow between internal elements of the electronic device 200, and may process data. For example, the processor 350 may control the communication circuit 310 and/or the memory 330 operatively connected thereto.

According to various embodiments, the processor 320 may transmit an advertisement packet in a first attribute (e.g., scannable) in order to perform an operation of determining whether or not the electronic device is lost in relation to the communication state with the first external electronic device 201.

According to various embodiments, the processor 320 may identify identification information of a packet transmission device from a scan request packet received after transmission of an advertisement packet in a first attribute and identify whether or not it is a scan request received from the first external electronic device 201.

According to various embodiments, the processor 320 may determine the loss state of the electronic device 200 if a scan request is not received from the first external electronic device 201 for a specified period of time.

According to various embodiments, the processor 320 may transmit an advertisement packet in a second attribute, including loss notification information of the electronic device 200 according to a specified condition. For example, the loss notification information may include a lost indication flag. For example, the loss notification information may include battery information of the electronic device 200 and/or information about the time of receiving the last packet (e.g., a scan request) from the first external electronic device 201.

According to various embodiments, the transmission cycle of an advertisement packet including loss notification information of the electronic device 200 and/or the transmission signal strength range thereof may be adjusted based on the location information of the electronic device 200 and/or the communication environment.

According to various embodiments, the electronic device 200 may transmit an advertisement packet including loss notification information in a specified cycle. In an embodiment, the electronic device 200 may transmit an advertisement packet including loss notification information and then switch to an inactive state until the next specified cycle. In an embodiment, in the inactive state, the processor 320 of the electronic device 200 may cut off power supplied to the main processor (e.g., the main processor 121 in FIG. 1) and operate using the power supplied to the auxiliary processor (e.g., the auxiliary processor 123 in FIG. 1) operating with low power. In an embodiment, in a low power state, the advertisement packet transmission cycle may be configured to be greater than that in a non-loss state, and only simple calculations such as time calculation may be performed. As the operation is performed in the low power state according to an embodiment, the advertisement packet may be transmitted for as long as possible.

Figure 4:
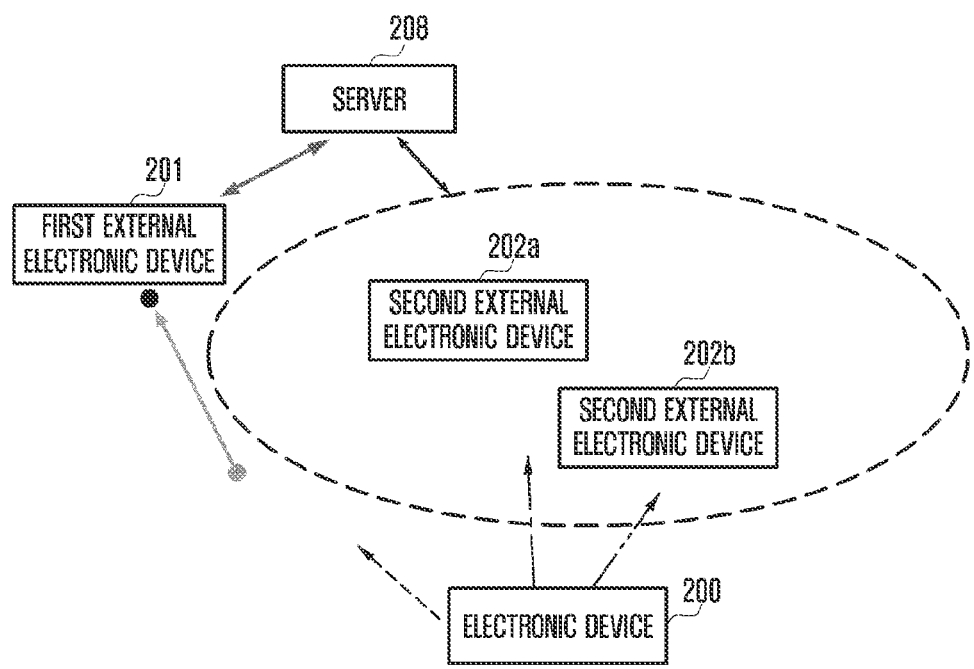
FIG. 4 is a diagram illustrating an example of a communication environment according to loss of an electronic device according to various embodiments.

FIG. 4 is a diagram illustrating an example of a communication environment according to loss of an electronic device (e.g., the electronic device 200 in FIG. 2 or 3) according to various embodiments.

According to various embodiments, the electronic device 200, as described with reference to FIG. 2 or 3, may include a portable electronic device (e.g., a smartphone or a tablet PC) or a wearable device (e.g., a wireless audio device, a smart watch, or a missing child prevention device) capable of short-range wireless communication (e.g., Bluetooth or Bluetooth low energy (BLE)). For example, the electronic device 200 may include at least some elements identical or similar to those of the electronic device 101 shown in FIG. 1 or 3.

According to various embodiments, the first external electronic device 201, as described with reference to FIG. 2 or 3, may be a device that determines the loss state of the electronic device 200, based on the communication state with the electronic device 200, and tracks the electronic device 200 through the server 208 to obtain information. For example, the first external electronic device 201 may include elements identical to or similar to those of the electronic device 101 in FIG. 1. For example, the first external electronic device 201 may include a portable electronic device (e.g., a smartphone) having a communication function.

Referring to FIG. 4, the electronic device 200 may store identification information (e.g., a device unique identifier or a device address) of the first external electronic device (e.g., the first external electronic device 201 in FIG. 2). For example, the electronic device 200 may obtain identification information of the first external electronic device 201 from a packet received from the first external electronic device 201 through short-range wireless communication with the first external electronic device 201 and store the same. For example, the electronic device 200 may transmit an advertisement packet to the first external electronic device 201 and receive an acknowledgment packet from the first external electronic device 201. For example, the electronic device 200 may transmit an advertisement packet to the first external electronic device 201 and receive a scan request packet from the first external electronic device 201. For example, the scan request packet may contain device identification information (e.g., a device unique identifier or a device address). The electronic device 200 may obtain identification information of the first external electronic device 201 from the scan request packet received from the first external electronic device 201.

According to various embodiments, the electronic device 200 may or may not establish a communication link with the first external electronic device 201 after receiving the acknowledge packet for the transmitted advertisement packet from the first external electronic device 201. According to various embodiments, the electronic device 200 may or may not establish a communication link with the first external electronic device 201 after transmitting a scan response packet to a scan request packet received from the first external electronic device 201 after transmitting an advertisement packet.

According to various embodiments, the electronic device 200 may connect to the first external electronic device 201 to perform communication. According to various embodiments, the electronic device 200 may perform communication by transmitting and/or receiving a packet in a specified cycle or at an unspecified time when communication is required while the electronic device 200 is not connected to the first external electronic device 201.

According to various embodiments, the electronic device 200 may identify communication disconnection during communication with the first external electronic device 201 connected thereto. For example, if the communication connection with the first external electronic device 201 is interrupted, the electronic device 200 may determine that the communication is disconnected. For example, if the electronic device 200 does not receive a packet from the first external electronic device 201 for a specified time or more while communicating with the first external electronic device 201, the electronic device 200 may determine that the communication is disconnected. Hereinafter, the cases in which communication is disconnected may be described as including these cases.

According to various embodiments, communication between the electronic device 200 and the first external electronic device 201 may be disconnected in various situations. For example, the electronic device 200 may release a communication connection with the first external electronic device 201 in order to efficiently use limited radio resources. As another example, communication may be disconnected for various reasons while the electronic device 200 releases a communication connection with the first external electronic device 201 and performs communication by periodically or aperiodically transmitting and receiving packets. As another example, if the electronic device 200 and the first external electronic device 201 are spaced apart from each other by a specified distance or more (e.g., movement from a first location 401 to a second location 402), and/or if the quality of a signal (e.g., reference signal received power (RSRP), reference received quality (RSRQ), or received signal strength indication (RSSI)) received from the first external electronic device 201 is less than a specified value, the communication connection may be disconnected.

According to various embodiments, the electronic device 200 may identify that the connection with the first external electronic device 201 is disconnected. According to various embodiments, if communication with the first external electronic device 201 is disconnected, the electronic device 200 may perform an operation of determining whether or not the electronic device has been lost.

According to various embodiments, if the communication disconnection is identified, the electronic device 200 may transmit an advertisement packet in a first attribute to determine whether or not the electronic device has been lost. For example, the first attribute may include a scannable attribute. For example, the advertisement packet in the first attribute may include an advertisement packet (ADV_IND) including both a scannable attribute and a connectable attribute and/or an advertisement packet (ADV_SCAN_IND) including a scannable attribute and a non-connectable attribute. According to an embodiment, if an advertisement packet including a scannable attribute is received, the first external electronic device 201 may transmit a scan request to the electronic device 200 and, if a scan response is received from the electronic device 200, may determine that the electronic device is not in the loss state. According to another embodiment, if the advertisement packet of the first external electronic device 200 includes a connectable attribute, it may be possible to further connect a physical communication link to change the attribute of the electronic device 200 and then to change the attribute. In an embodiment, the electronic device 200 may transmit the advertisement packet in the first attribute in a specified cycle for a specified period of time.

According to various embodiments, the electronic device 200 may identify whether a scan request packet to the transmitted advertisement packet in the first attribute is received from the first external electronic device 201. For example, the electronic device 200 may extract identification information (e.g., a device unique identifier or a device address) from a received scan request packet, compare the identification information with stored identification information of the first external electronic device 201, and, if they match, identify that the scan request packet has been received from the external electronic device 201.

According to various embodiments, the electronic device 200 may determine its own loss state, based on whether or not the scan request packet is received. In an embodiment, the electronic device 200 may transmit an advertisement packet in a first attribute and determine its own loss state depending on whether or not a scan request packet is received from the first external electronic device 201 for a specified period of time. For example, if a scan request packet is not received from the first external electronic device 201 for a specified period of time after transmitting an advertisement packet in a first attribute, the electronic device 200 may determine that the electronic device 200 is in the loss state.

According to various embodiments, a method for performing the operation of determining whether or not the electronic device 200 is lost and the time for determining the loss state may be determined based on various situations of the electronic device 200. For example, various situations of the electronic device 200 may include a variety of information such as location information, time information, device characteristic information, and/or a communication environment of the electronic device 200.

For example, if the electronic device 200 is determined to be located in a safe place such as home, based on the location information, or is determined to be connected to an access point such as a specific wireless router registered by the user, the electronic device 200 may be configured not to start the operation of determining whether or not the electronic device is lost for a relatively long time from the time of receiving the last packet from the first external electronic device 201, and may configure the transmission cycle of the advertisement packet in the first attribute for determining loss to be relatively long and wait to receive a scan request packet from the first external electronic device 201 for a relatively long time.

For example, in the night time, compared to the day time, based on the time information, the electronic device 200 may be configured to start the operation of determining whether or not the electronic device is lost within a relatively short time from the time of receiving the last packet from the first external electronic device 201, and may configure the transmission cycle of the advertisement packet in the first attribute for determining loss to be relatively short and wait to receive a scan request packet from the first external electronic device 201 for a relatively short time. Accordingly, the probability of identifying the electronic device 200 may be relatively increased in the night time compared to the day time.

For example, in the case where the electronic device 200 is configured as an important device, based on the device characteristic information, the electronic device 200 may be configured to start the operation of determining whether or not the electronic device is lost within a relatively short time from the time of receiving the last packet from the first external electronic device 201, and may configure the transmission cycle of the advertisement packet in the first attribute to be relatively short and wait to receive a scan request packet from the first external electronic device 201 for a relatively short time.

According to various embodiments, if the electronic device 200 is determined to be in the loss state, the electronic device 200 may transmit a packet including loss notification information. For example, the packet including loss notification information may include an advertisement packet in a second attribute. For example, the advertisement packet in the second attribute may include an advertisement packet including a broadcast attribute. For example, the broadcast attribute may include an attribute of transmitting a packet without specifying a receiving device. As another example, the advertisement packet in the second attribute may include an advertisement packet (ADV_IND) including a scannable attribute and a connectable attribute in addition to a broadcast attribute, an advertisement packet (ADV_NONCONN_IND) including a broadcast attribute, a non-connectable attribute, and an unscannable attribute, or an advertisement packet (ADV_SCAN_IND) including a broadcast attribute, a scannable attribute, and a non-connectable attribute.

The three types of advertisement packets (ADV_IND, ADV_NONCONN_IND, and ADV_SCAN_IND) described above have in common data for determining the loss state in the packet, and the second external electronic devices 202a and/or 202b may upload, to the server 208, information of the detected electronic device 200 discovered by identifying the data capable of determining the loss state. For example, if the second external electronic devices 202a and/or 202b receive a packet having a scan attribute, the second external electronic devices 202a and/or 202b may transmit a scan request to the electronic device 200 and receive a response thereto to obtain additional data, thereby uploading the obtained data to the server 208. For example, if the second external electronic devices 202a and/or 202b receive a packet having a connectable attribute, the second external electronic devices 202a and/or 202b may connect to the electronic device 200 and encrypt the discovery time, current time, location, and/or discoverer information, thereby configuring the same in the electronic device 200.

According to various embodiments, the advertisement packet including loss notification information may include a variety of information such as identification information (e.g., a device unique identifier or a device address) of the electronic device 200, an address type, a local name of the electronic device 200, a transmission power level (Tx power level), or Bluetooth attribute information. In an embodiment, the loss notification information may include a lost indication flag indicating whether or not the electronic device is lost. As another example, the loss notification information may include battery information of the electronic device 200 and/or information about the time of receiving the last packet (e.g., a scan request) from the first external electronic device 201. As another example, the loss notification information may be included in a manufacturer-specific data field, which is an area that may be used arbitrarily by each manufacturer in a packet.

According to various embodiments, transmission of the advertisement packet including loss notification information of the electronic device 200 may be determined based on various situations of the electronic device 200. For example, a transmission method including a transmission cycle of the advertisement packet including loss notification information of the electronic device 200 and/or a transmission signal strength range thereof may be determined based on various situations of the electronic device 200. For example, various situations of the electronic device 200 may include a variety of information such as current location information, time information, characteristic information, and/or communication environment of the electronic device 200.

For example, if the electronic device 200 is determined to be located in a safe place such as home, based on the location information, the advertisement packet in the second attribute may be configured to be transmitted in a relatively long cycle and/or with relatively low transmission power.

For example, in the night time, compared to the day time, based on the time information, the advertisement packet in the second attribute may be configured to be transmitted in a relatively short cycle and/or with relatively high transmission power.

For example, in the case where the electronic device 200 is configured as an important device, based on the device characteristic information, the electronic device 200 may transmit the advertisement packet in the second attribute in a relatively short cycle and/or with relatively high transmission power.

For example, the electronic device 200 may obtain an attribute of the location of the electronic device 200 through a previous connection with the first external electronic device 201. In addition, if the electronic device 200 is determined to be located in a place (e.g., a densely populated area with frequent traffic) where a plurality of external electronic devices (e.g., the second external electronic device 202a or 202b in FIG. 2) coexist, based on the communication environment information, the advertisement packet in the second attribute may be configured to be transmitted in a relatively short cycle and/or with relatively high transmission power.

According to various embodiments, the electronic device 200 may switch to an inactive state until the next specified cycle after transmitting the advertisement packet including loss notification information. For example, in the inactive state, the processor 320 of the electronic device 200 may cut off power supplied to the main processor (e.g., the main processor 121 in FIG. 1) and operate using the power supplied to the auxiliary processor (e.g., the auxiliary processor 123 in FIG. 1) operating with low power.

According to various embodiments, at least one second external electronic device (e.g., at least one of the second external electronic device 202a and the second external electronic device 202b) may receive the advertisement packet in the second attribute broadcast from the lost electronic device 200. For example, as described with reference to FIG. 2, the second external electronic device 202a and/or 202b may include elements identical or similar to those of the electronic device 101 in FIG. 1. For example, the second external electronic device 202a and/or 202b may include a portable electronic device (e.g., a smartphone) having a communication function.

According to various embodiments, at least one second external electronic device (e.g., at least one of the second external electronic device 202a and the second external electronic device 202b) may receive the advertisement packet in the second attribute broadcast from the lost electronic device 200, identify loss notification information, and transmit identification information of the electronic device 200 and its own location information to the server 208. For example, the second external electronic devices 202a and/or 202b may identify loss notification information included in the advertisement packet in the second attribute and transmit, to the server 208, at least some of the loss notification information together with identification information of the electronic device 200 and its own location information.

According to various embodiments, when the server 208 receives the identification information of the electronic device 200 and the location information of the at least one second external electronic device 202a and/or 202b, the server 208 may identify the first external electronic device 201 related to the electronic device 200, based on the identification information of the electronic device 200. In an embodiment, the first external electronic device 201 may transmit information related to the electronic device 200 and the first external electronic device 201 to the server 208 in order to track the electronic device 200. For example, in order to track the electronic device 200 when the electronic device 200 is lost, the first external electronic device 201 may transmit the identification information of the electronic device 200 together with its own identification information to the server 208 providing a tracking service such that the information is registered in the server 208. For example, if the first external electronic device 201 connects with the electronic device 200, the first external electronic device 201 may transmit identification information of the electronic device 200 together with its own identification information to the server 208. As another example, if the electronic device 200 is determined to be lost, the first external electronic device 201 may transmit identification information of the electronic device 200 to the server 208 together with its own identification information.

According to various embodiments, the first external electronic device 201 may receive at least one second external electronic device 202*a* and/or 202*b* from the server 208, based on its own identification information and the identification information of the electronic device 200. According to various embodiments, the first external electronic device 201 may receive loss notification information of the electronic device 200 from the server 208, based on its own identification information. According to various embodiments, the user of the first external electronic device 201 may track the electronic device 200, based on the location information of at least one second external electronic device 202*a* and/or 202*b*.

Figure 5:
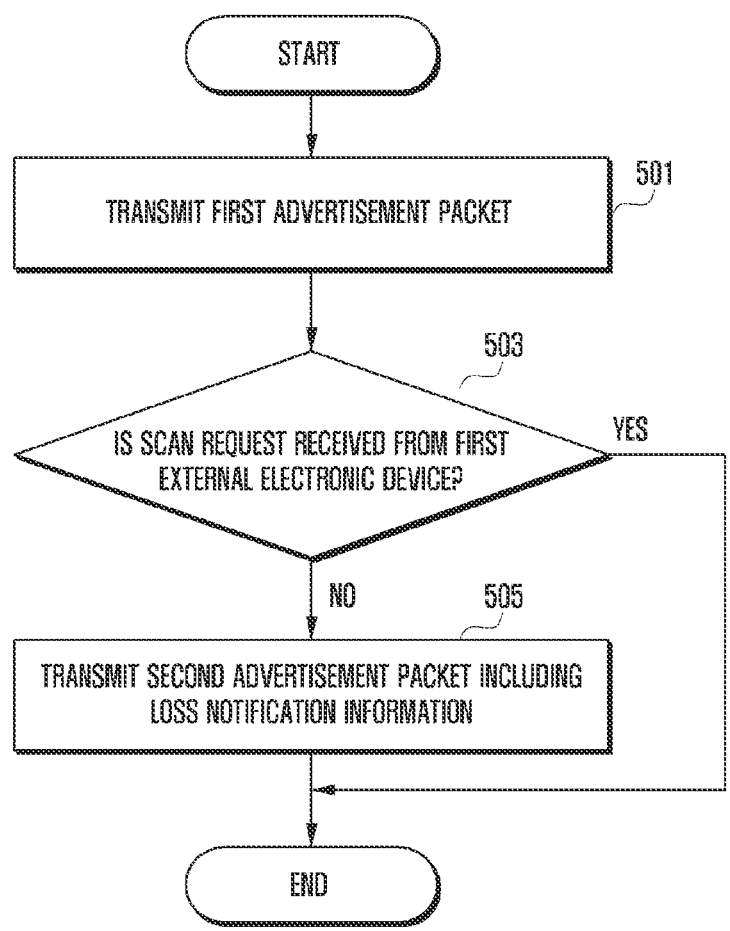
FIG. 5 is a flowchart illustrating a method for reporting a loss state of an electronic device according to various embodiments.

FIG. 5 is a flowchart illustrating a method for reporting a loss state of an electronic device (e.g., the electronic device 200 in FIGS. 2 to 4) according to various embodiments.

Referring to FIG. 5, the electronic device 200, as described with reference to FIGS. 2 to 4, may include a portable electronic device (e.g., a smartphone or a tablet PC) or a wearable device (e.g., a wireless audio device, a smart watch, or a missing child prevention device) capable of short-range wireless communication (e.g., Bluetooth or Bluetooth low energy (BLE)). For example, the electronic device 200 may include at least some elements identical or similar to those of the electronic device 101 shown in FIG. 1 or 3.

According to various embodiments, in operation 501, communication with a first external electronic device (e.g., the first external electronic device 201 in FIGS. 2 to 4) is disconnected, a processor (e.g., the processor 320 in FIG. 3) of the electronic device 200 may transmit an advertisement packet in a first attribute through a communication circuit (e.g., the communication circuit 310 in FIG. 3). For example, the first external electronic device 201, as described with reference to FIG. 2, may include elements identical or similar to those of the electronic device 101 in FIG. 1 and may include a portable electronic device (e.g., a smartphone) having a communication function.

According to an embodiment, if the connection with the first external electronic device 201 is identified to be disconnected, the processor 320 may transmit the advertisement packet in the first attribute in a specified cycle for a specified period of time. According to an embodiment, if the connection with the first external electronic device 201 is determined to be disconnected, the processor 320 may transmit the advertisement packet in the first attribute immediately or after a specified period of time. For example, the processor 320 may determine that the communication is disconnected if the communication connection is interrupted while connecting and communicating with the first external electronic device 201. As another example, if a packet is not received from the first external electronic device 201 for a specified time or more while performing communication in the state of not being connected with the first external electronic device 201, the processor 320 may determine that the communication is disconnected.

According to an embodiment, the advertisement packet in the first attribute may include a scannable attribute. For example, the advertisement packet in the first attribute may include an advertisement packet (ADV_IND) including both a scannable attribute and a connectable attribute and/or an advertisement packet (ADV_SCAN_IND) including a scannable attribute and a non-connectable attribute.

The three types of advertisement packets (ADV_IND, ADV_NONCONN_IND, and ADV_SCAN_IND) described above have in common data for determining the loss state in the packet, and the second external electronic devices 202*a* and/or 202*b* may upload, to the server 208, information of the detected electronic device 200 discovered by identifying the loss notification information. For example, if the second external electronic devices 202*a* and/or 202*b* receive a packet having a scan attribute, the second external electronic devices 202*a* and/or 202*b* may transmit a scan request to the electronic device 200 and receive a response thereto to obtain additional data, thereby uploading the obtained data to the server 208. For example, if the second external electronic devices 202*a* and/or 202*b* receive a packet having a connectable attribute, the second external electronic devices 202*a* and/or 202*b* may connect to the electronic device 200 and encrypt the discovery time, current time, location, and/or discoverer information, thereby configuring the same in the electronic device 200.

According to various embodiments, in operation 503, the processor 320 may identify whether or not a scan request packet is received from the first external electronic device 201 for the transmitted advertisement packet in the first attribute. According to an embodiment, the memory (e.g., the memory 330 in FIG. 3) of the electronic device 200 may store identification information (e.g., a device unique identifier or a device address) of the first external electronic device 201 (e.g., the first external electronic device 201 in FIGS. 2 to 4), and the processor 320 may obtain the identification information of the first external electronic device 201 from the packet received from the first external electronic device 201 through short-range wireless communication with the first external electronic device 201 and store the same in the memory 330.

According to an embodiment, the electronic device 200 may extract identification information from a received scan request packet, compare the identification information with stored identification information of the first external electronic device 201, and, if they match, identify that the scan request packet has been received from the external electronic device 201.

According to various embodiments, if a scan request packet is received from the first external electronic device 201 for a specified period of time after transmitting the advertisement packet in the first attribute, the processor 320 may determine a loss state.

According to various embodiments, the processor 320 may transmit an advertisement packet in a second attribute including loss notification information through the communication circuit 310 in operation 505. For example, the advertisement packet in the second attribute may include an advertisement packet including a broadcast attribute. For example, the broadcast attribute may include an attribute of transmitting a packet without specifying a receiving device. For example, the advertisement packet in the second attribute may include an advertisement packet (ADV_IND) including a scannable attribute and a connectable attribute in addition to a broadcast attribute, an advertisement packet (ADV_NONCONN_IND) including a broadcast attribute, a non-connectable attribute, and an unscannable attribute, or an advertisement packet (ADV_SCAN_IND) including a broadcast attribute, a scannable attribute, and a non-connectable attribute.

According to various embodiments, the advertisement packet in the second attribute including loss notification information may include a variety of information such as identification information (e.g., a device unique identifier or a device address) of the electronic device 200, an address type, a local name of the electronic device 200, a transmission power level (Tx power level), or Bluetooth attribute information. In an embodiment, the loss notification information may include a lost indication flag indicating whether or not the electronic device is lost. In another embodiment, the loss notification information may include battery information of the electronic device 200 and/or information about the time of receiving the last packet (e.g., a scan request) from the first external electronic device 201. In another embodiment, the loss notification information may be included in a manufacturer-specific data field, which is an area that may be used arbitrarily by each manufacturer in a packet.

According to various embodiments, at least one second external electronic device (e.g., the second external electronic devices 202a and/or 202b in FIG. 2 or FIG. 4) receiving the communication advertisement packet in the second attribute broadcast from the electronic device 200, based on lost information included in the received advertisement packet in the second attribute, may transmit the identification information of the electronic device 200 together with its own location information to a server (e.g., the server 208 in FIG. 2 or 4). For example, the second external electronic devices 202a and/or 202b, as described with reference to FIG. 2, may include elements identical or similar to those of the electronic device 101 in FIG. 1 and include a portable electronic device (e.g., a smartphone) having communication control authority.

The three types of advertisement packets (ADV_IND, ADV_NONCONN_IND, and ADV_SCAN_IND) described above have in common data for determining the loss state in the packet, and the second external electronic devices 202a and/or 202b may upload, to the server 208, information of the detected electronic device 200 discovered by identifying the loss notification information. For example, if the second external electronic devices 202a and/or 202b receive a packet having a scan attribute, the second external electronic devices 202a and/or 202b may transmit a scan request to the electronic device 200 and receive a response thereto to obtain additional data, thereby uploading the obtained data to the server 208. For example, if the second external electronic devices 202a and/or 202b receive a packet having a connectable attribute, the second external electronic devices 202a and/or 202b may connect to the electronic device 200 and encrypt the discovery time, current time, location, and/or discoverer information, thereby configuring the same in the electronic device 200.

According to various embodiments, if the server 208 receives the identification information of the electronic device 200 and the location information of at least one second external electronic device 202a and/or 202b, the server 208 may identify the first external electronic device 201 related to the electronic device 200, based on the identification information of the electronic device 200. According to various embodiments, the first external electronic device 201, based on its own identification information, may obtain the identification information of the electronic device 200 and the location information of at least one second external electronic device 202a and/or 202 from the server 208. According to various embodiments, the user of the first external electronic device 201 may track the lost electronic device 200, based on the location information of at least one second external electronic device 202a and/or 202b.

Figure 6:
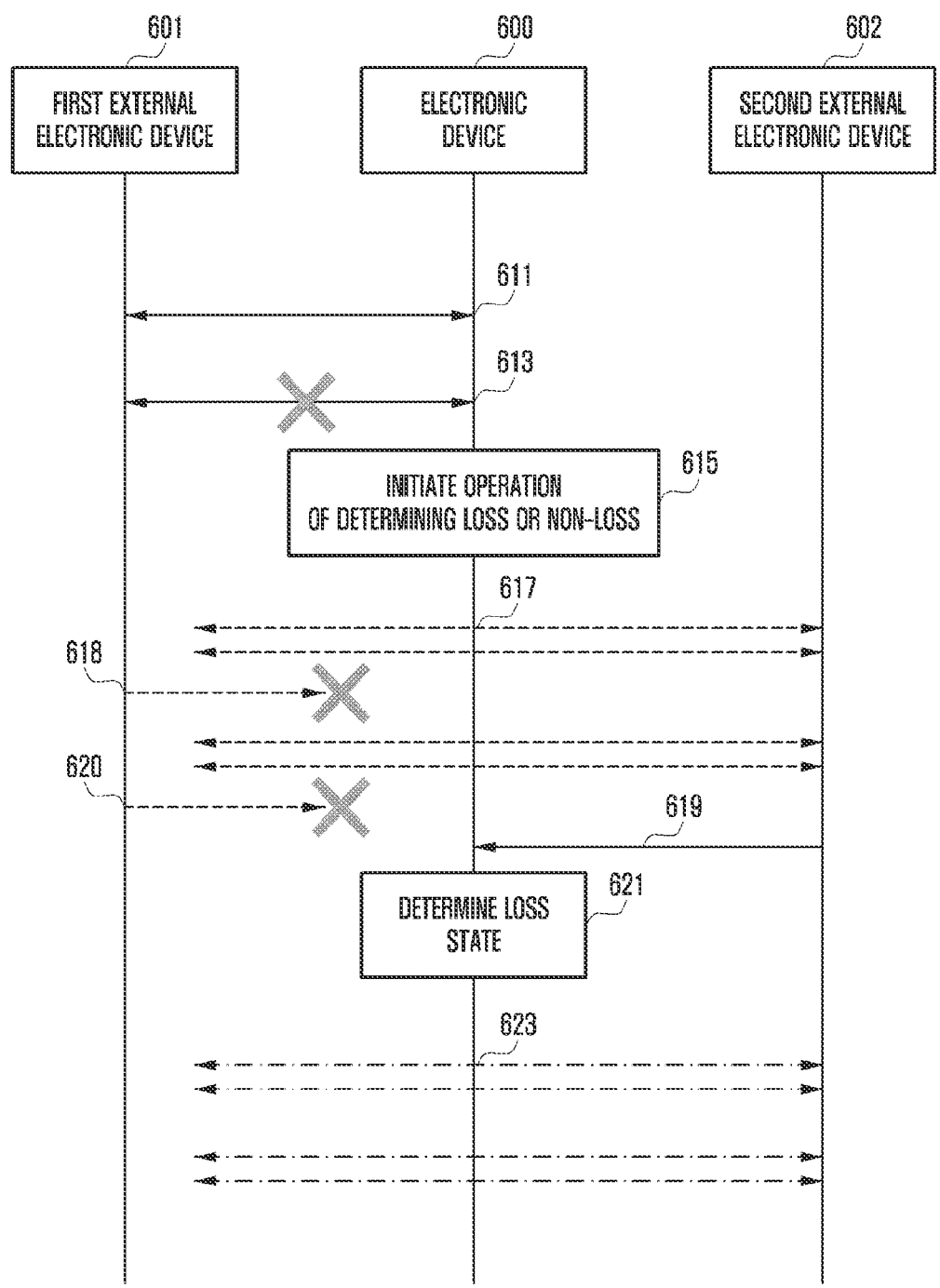
FIG. 6 is a signal flowchart for reporting a loss state of an electronic device according to various embodiments.

FIG. 6 is a signal flowchart for reporting a loss state of an electronic device 600 (e.g., the electronic device 200 in FIGS. 2 to 4) according to various embodiments.

According to various embodiments, an electronic device 600 may be a device that determines its own loss state, based on a communication state with a first external electronic device 601 (e.g., the first external electronic device 201 in FIGS. 2 to 4), and broadcasts a packet including loss notification information. For example, the electronic device 600 may include a portable electronic device (e.g., a smartphone or a tablet PC) or a wearable device (e.g., a wireless audio device, a smart watch, or a missing child prevention device) capable of short-distance wireless communication (e.g., Bluetooth or Bluetooth low energy (BLE)). For example, the electronic device 600 may include at least some elements identical or similar to those of the electronic device 101 shown in FIG. 1.

According to various embodiments, the first external electronic device 601 may be a device related to the electronic device 600, which, for example, transmits identification information of the electronic device 600 and its own identification information to a server (e.g., the server 208 in FIG. 2 or 4) to verify the relevance and obtains information for tracking the lost electronic device 600 through the server 208. For example, the first external electronic device 601 may include elements identical or similar to those of the electronic device 101 in FIG. 1. For example, the first external electronic device 601 may include a portable electronic device (e.g., a smartphone) having a communication function.

According to various embodiments, at least one second external electronic device 602 (e.g., the second external electronic device 202a and/or the second external electronic device 202b) may be a device that receives a packet broadcast from the lost electronic device 600 and transmits, to the server 208, identification information of the electronic device 600 together with its own location information. For example, the second external electronic devices 602 may include elements identical to or similar to those of the electronic device 101 in FIG. 1. For example, the second external electronic devices 602 may include a portable electronic device (e.g., a smartphone) capable of communication.

According to various embodiments, in operation 611, a processor (e.g., the processor 320 in FIG. 2) of the electronic device 600 may perform communication by transmitting and/or receiving a packet in a specified cycle or at the time when communication is required while the electronic device 600 is connected or is not connected to the first external electronic device 601.

According to various embodiments, the processor 320 may identify communication disconnection during communication with the first external electronic device 601 in operation 613. For example, if the connection with the first external electronic device 601 is interrupted while communicating with the first external electronic device 601, the processor 320 may determine that the communication is disconnected. For example, if the processor 320 does not receive a packet from the first external electronic device 601 for a specified time or more while performing communication in the state of not being connected with the first external electronic device 601, the processor 320 may determine that the communication is disconnected. For example, the processor 320 of the electronic device 600 may release a communication connection with the first external electronic device 601 in order to efficiently use limited radio resources. For example, if the electronic device 600 and the first external electronic device 601 are spaced apart from each other by a specified distance or more, and/or if the quality of a signal received from the first external electronic device 601 is less than a specified value, a packet may not be received.

According to various embodiments, as the communication with the first external electronic device 601 is identified to be disconnected, the processor 320 may initiate an operation of determining whether or not the electronic device is lost in relation to the communication state with the first external electronic device 601 in operation 615. According to various embodiments, the time of initiating the operation of determining whether or not the electronic device is lost may be determined based on various situations of the electronic device 600. For example, the time of initiating the operation of determining whether or not the electronic device is lost may be determined based on a variety of information such as location information, time information, device characteristic information, and/or a communication environment of the electronic device 600.

For example, if the electronic device 600 is determined to be located in a safe place such as home, based on the location information, the processor 320 may perform configuration so as not to start the operation of determining whether or not the electronic device is lost for a relatively long time from the time of receiving the last packet from the first external electronic device 601. For example, in the night time, compared to the day time, based on the time information, the processor 320 may perform configuration so as to start the operation of determining whether or not the electronic device is lost within a relatively short time from the time of receiving the last packet from the first external electronic device 601. For example, in the case where the electronic device 600 is configured as an important device, based on the device characteristic information, the processor 320 may perform configuration so as to start the operation of determining whether or not the electronic device is lost within a relatively short time from the time of receiving the last packet from the first external electronic device 601.

According to various embodiments, in operation 617, the processor 320 may transmit an advertisement packet in a first attribute as the operation of determining whether or not the electronic device is lost in relation to the communication state between the electronic device 600 and the first external electronic device 601 starts. For example, the first attribute may include a scannable attribute. For example, the advertisement packet in the first attribute may include an advertisement packet (ADV_IND) including both a scannable attribute and a connectable attribute and/or an advertisement packet (ADV_SCAN_IND) including a scannable attribute and a non-connectable attribute. For example, the electronic device 200 may transmit the advertisement packet in the first attribute in a specified cycle for a specified period of time.

According to various embodiments, an operation cycle and/or time for determining whether or not the electronic device 600 is lost may be determined based on various situations of the electronic device 600. For example, various situations of the electronic device 600 may include a variety of information such as location information, time information, device characteristic information, and/or communication environment of the electronic device 600. For example, if it is determined based on the location information that the electronic device 600 is located in a specified place, such as when it is determined that the electronic device 600 is connected to an access point such as a specific wireless router registered by the user, the operation cycle of determining whether or not the electronic device 600 is lost may be configured to be relatively long, and it may be configured to wait to receive a scan request packet from the first external electronic device 601 for a relatively long time. For example, in the night time, compared to the day time, based on the time information, the electronic device 600 may configure the transmission cycle of the advertisement packet in the first attribute to be relatively short and wait to receive a scan request packet from the first external electronic device 601 for a relatively short time. Accordingly, the probability of identifying the electronic device 600 may be relatively increased in the night time compared to the day time. For example, in the case where the electronic device 600 is configured as an important device, based on the device characteristic information, the electronic device 600 may configure the transmission cycle of the advertisement packet in the first attribute to be relatively short and wait to receive a scan request packet from the first external electronic device 601 for a relatively short time.

According to various embodiments, the processor 320 may identify whether or not a scan request packet (e.g., operation 618 and/or operation 620) is received from the first external electronic device 601 for the transmitted advertisement packet in the first attribute during the operation time of determining whether or not the electronic device is lost. For example, the processor 320 may extract identification information (e.g., a device unique identifier or a device address) from a received scan request packet, compare the identification information with stored identification information of the first external electronic device 601, and, if they match, identify that the scan request packet has been received from the external electronic device 601.

According to an embodiment, the processor 320 may receive a scan request packet (e.g., operation 619) from the second external electronic device 602 for the transmitted advertisement packet in the first attribute during the operation time of determining whether or not the electronic device is lost. In this case, the processor 320 may extract identification information (e.g., a device unique identifier or a device address) from a received scan request packet, compare the identification information with stored identification information of the first external electronic device 601, and, if they do not match, identify that the scan request packet is not the packet received from the external electronic device 601.

According to various embodiments, the processor 320 may determine its own loss state, based on a result of performing the operation of determining whether or not the electronic device is lost in operation 621. For example, if a scan request packet is not received from the first external electronic device 601 according to transmission of the advertisement packet in the first attribute during the operation of determining loss, the electronic device 600 may determine that the electronic device 600 is in the loss state.

According to various embodiments, the processor 320 may transmit a packet including loss notification information in operation 623. For example, the packet including loss notification information may include an advertisement packet in a second attribute. As another example, the advertisement packet in the second attribute may include an advertisement packet including a broadcast attribute. For example, the broadcast attribute may include an attribute of transmitting a packet without specifying a receiving device. As another example, the advertisement packet in the second attribute may include an advertisement packet (ADV_IND) including a scannable attribute and a connectable attribute in addition to a broadcast attribute, an advertisement packet (ADV_NONCONN_IND) including a broadcast attribute, a non-connectable attribute, and an unscannable attribute, or an advertisement packet (ADV_SCAN_IND) including a broadcast attribute, a scannable attribute, and a non-connectable attribute.

According to various embodiments, the advertisement packet including loss notification information may include a variety of information such as identification information (e.g., a device unique identifier or a device address) of the electronic device 600, an address type, a local name of the electronic device 600, a transmission power level (Tx power level), or Bluetooth attribute information. For example, the loss notification information may include a lost indication flag indicating whether or not the electronic device is lost. For example, the loss notification information may include battery information of the electronic device 600 and/or information about the time of receiving the last packet (e.g., a scan request) from the first external electronic device 601. For example, the loss notification information may be included in a manufacturer-specific data field, which is an area that may be used arbitrarily by each manufacturer in a packet.

According to various embodiments, transmission of the advertisement packet including loss notification information of the electronic device 600 may be determined based on various situations of the electronic device 600. For example, a transmission method including a transmission cycle of the advertisement packet including loss notification information of the electronic device 600 and/or a transmission signal strength range thereof may be determined based on various situations of the electronic device 600. For example, various situations of the electronic device 600 may include a variety of information such as current location information, time information, characteristic information, and/or communication environment of the electronic device 600.

For example, if the electronic device 600 is determined to be located in a safe place such as home, based on the location information, the advertisement packet in the second attribute may be configured to be transmitted in a relatively long cycle and/or with relatively low transmission power. For example, in the night time, compared to the day time, based on the time information, the advertisement packet in the second attribute may be configured to be transmitted in a relatively short cycle and/or with relatively high transmission power. For example, in the case where the electronic device 600 is configured as an important device, based on the device characteristic information, the electronic device 600 may transmit the advertisement packet in the second attribute in a relatively short cycle and/or with relatively high transmission power. For example, if the electronic device 600 is determined to be located in a place (e.g., a densely populated area with frequent traffic) where a plurality of external electronic devices (e.g., the second external electronic device 202a or 202b in FIG. 2) coexist, based on the communication environment information, the processor 320 may control the advertisement packet in the second attribute to be transmitted in a relatively short cycle and/or with relatively high transmission power.

According to various embodiments, the electronic device 600 may switch to an inactive state until the next specified cycle after transmitting the advertisement packet including loss notification information. For example, in the inactive state, the processor 320 of the electronic device 600 may cut off power supplied to the main processor (e.g., the main processor 121 in FIG. 1) and operate using the power supplied to the auxiliary processor (e.g., the auxiliary processor 123 in FIG. 1) operating with low power.

According to various embodiments, at least one second external electronic device 602 may receive the advertisement packet in the second attribute broadcast from the lost electronic device 600. For example, the second external electronic device 602 may receive the advertisement packet in the second attribute broadcast from the lost electronic device 600, identify loss notification information, and transmit identification information of the electronic device 600 and its own location information to the server 208. For example, the second external electronic device 602 may identify loss notification information included in the advertisement packet in the second attribute and transmit, to the server 208, at least some of the loss notification information together with identification information of the electronic device 600 and its own location information.

According to various embodiments, if the server 208 receives the identification information of the electronic device 600 and the location information of at least one second external electronic device 602, the server 208 may identify the first external electronic device 601 related to the electronic device 600, based on the identification information of the electronic device 600. According to various embodiments, the first external electronic device 601, based on its own identification information and the identification information of the electronic device 600, may obtain location information of at least one second external electronic device 602 from the server 208. For example, the first external electronic device 601 may transmit its own identification information and the identification information of the electronic device 600 to the server 208 in order to track the electronic device 600 and, based on this, receive location information of the second electronic device 602 transmitted together with the identification information of the electronic device 600 from the server 208. According to various embodiments, the user of the first external electronic device 601 may track the electronic device 600, based on the obtained location information of at least one second external electronic device 602.

Figure 7:
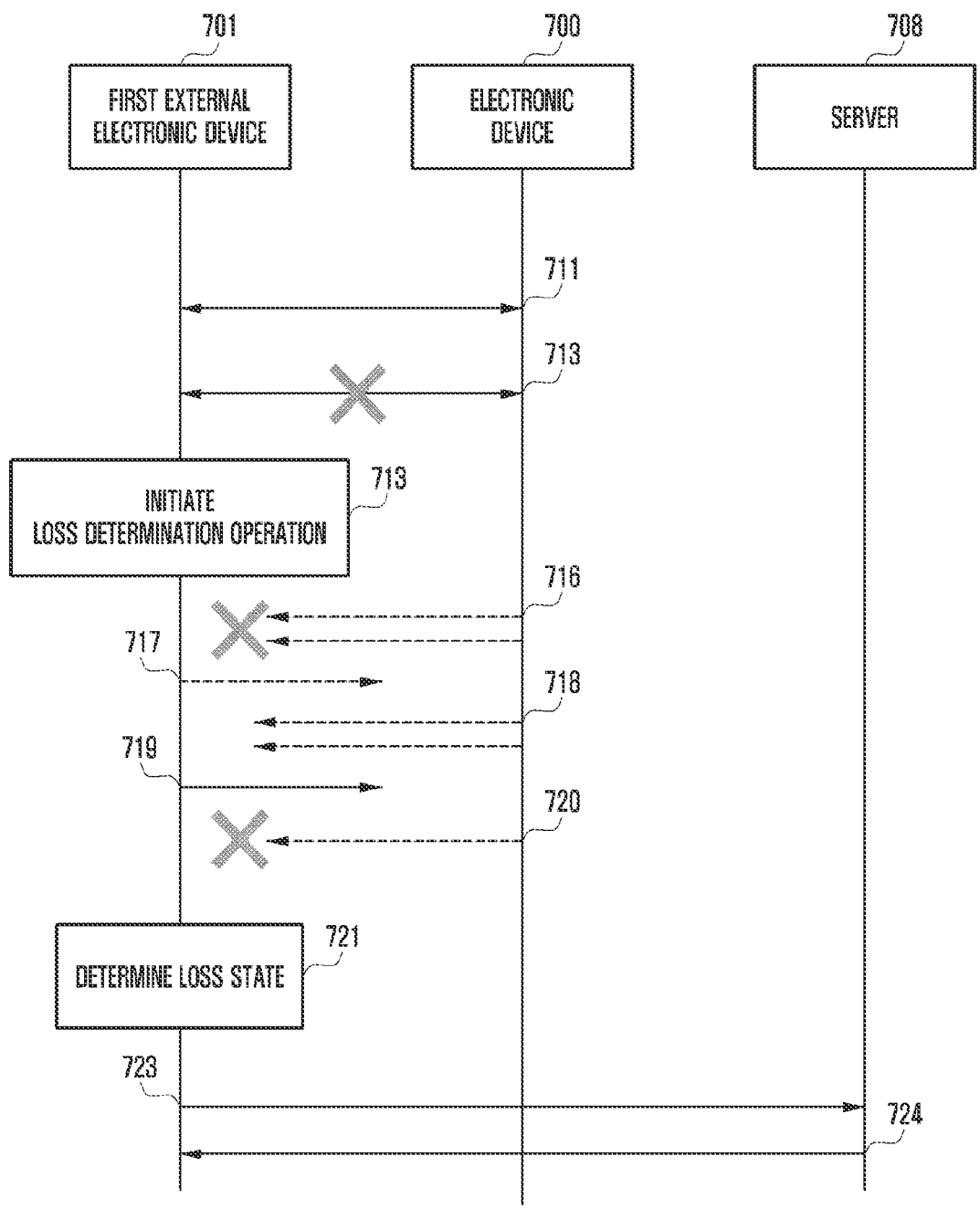
FIG. 7 is a signal flowchart for tracking a lost electronic device of a first external electronic device according to various embodiments.

FIG. 7 is a signal flowchart for tracking a lost electronic device 700 (e.g., the electronic device 200 in FIGS. 2 to 4) of a first external electronic device 701 (e.g., the first external electronic device 201 in FIGS. 2 to 4) according to various embodiments.

According to various embodiments, the first external electronic device 701 may be a device that determines the loss state of the electronic device 700, based on the communication state with the electronic device 700, and obtains related information of the electronic device 700 through the server 708 (e.g., the server 208 in FIG. 2 or 4). For example, the first external electronic device 701 is a device related to the electronic device 700, and may transmit its own identification information and identification information of the electronic device 700 to a server (e.g., the server 208 in FIG. 2 or 4) to prove the relevance and obtain information for tracking the lost electronic device 700 through the server 208. For example, the first external electronic device 701 may include elements identical or similar to those of the electronic device 101 in FIG. 1. For example, the first external electronic device 701 may include a portable electronic device (e.g., a smartphone) having a communication function.

For example, the electronic device 700 may be a device that determines its own loss state (hereinafter, referred to as a lost electronic device 700), based on the communication state with the first external electronic device 701, and broadcasts a packet including loss notification information. For example, the electronic device 700 may include a portable electronic device (e.g., a smartphone or a tablet PC) or a wearable device (e.g., a wireless audio device, a smart watch, or a missing child prevention device) capable of short-distance wireless communication (e.g., Bluetooth or Bluetooth low energy (BLE)).

According to various embodiments, in operation 711, the first external electronic device 701 may perform communication by transmitting and/or receiving a packet in a specified cycle or at the time when communication is required while the electronic device 700 is connected or is not connected to the first external electronic device 701.

According to various embodiments, the first external electronic device 701 may identify that communication is disconnected during communication with the electronic device 700 in operation 713. For example, if a connection with the electronic device 700 is interrupted while communicating with the electronic device 700, the first external electronic device 701 may determine that the communication is disconnected. For example, if the first external electronic device 701 does not receive a packet from the electronic device 700 for a specified time or more while performing communication in the state of not being connected with the electronic device 700, the first external electronic device 701 may determine that the communication is disconnected. For example, the first external electronic device 701 may release a communication connection with the electronic device 700 in order to efficiently use limited radio resources. For example, if the electronic device 700 is spaced a specified distance or more apart from the first external electronic device 701, and/or if the quality of a signal received from the electronic device 700 is less than a specified value, a packet may not be received.

According to various embodiments, as the first external electronic device 701 identifies that the communication with the electronic device 700 is disconnected, the first external electronic device 701 may initiate an operation of determining whether or not the electronic device is lost in relation to the communication state with the electronic device 700 and, accordingly, wait to receive a packet for a specified period of time in operation 715.

According to various embodiments, if an operation of determining whether or not the electronic device is lost is determined to be performed, the first external electronic device 701 may wait to receive (listen to) an advertisement packet from the electronic device 700 for a specified period of time. For example, the first external electronic device 701 may identify whether or not advertisement packets (e.g., 716 and/or 718) are received from the electronic device 700. For example, the first external electronic device 701 may extract identification information (e.g., a device unique identifier or a device address) from a received advertisement packet, compare the identification information with stored identification information of the electronic device 700, and, if they match, identify that the advertisement packet has been received from the electronic device 700.

According to various embodiments, upon receiving the advertisement packet from the electronic device 700 in operation 718, the first external electronic device 701 may transmit a scan request packet to the electronic device 700 according thereto in operations 717 and 719.

According to various embodiments, in operation 721, the first external electronic device 701 may determine that the electronic device 700 is in the loss state, based on a result of performing the operation of determining whether or not the electronic device 700 is lost. For example, if the advertisement packet is not received from the electronic device 700 during the operation of determining whether or not the electronic device 700 is lost, the first external electronic device 701 may determine that the electronic device 700 is in the loss state. For example, if a scan response packet to the scan request packet transmitted to the electronic device 700 in operation 719 is not received from the electronic device 700 in operation 720 even in the case where the advertisement packet is received from the electronic device 700, the first external electronic device 701 may determine that the electronic device 700 is in the loss state. According to an embodiment, if the electronic device 700 is determined to be in the loss state, the first external electronic device 701 may transmit related information of the electronic device 700 and the first external electronic device 701 to the server 708 in order to track the electronic device 700. For example, if the electronic device 700 is determined to be in the loss state, the first external electronic device 701, in order to track the electronic device 700, may transmit the identification information of the electronic device 700 together with its own identification information to the server 708 that provides a tracking service.

According to various embodiments, in operation 723 the first electronic device 701 may transmit its own identification information and the identification information of the electronic device 700 to the server 708, and in operation 724, the first external electronic device 701 may obtain location information of at least one second external electronic device (e.g., the second external electronic device 602 in FIG. 6) from the server 208, based on its own identification information and the identification information of the electronic device 700. For example, the first external electronic device 701 may transmit its own identification information and the identification information of the electronic device 700 to the server 708 (at operation 723) in order to track the electronic device 700 and, based on this, receive, from the server 708, location information of the second electronic device 602 transmitted together with the identification information of the electronic device 700 (at operation 724). According to various embodiments, the user of the first external electronic device 701 may track the electronic device 700, based on the obtained location information of at least one second external electronic device 602.

Figure 8:
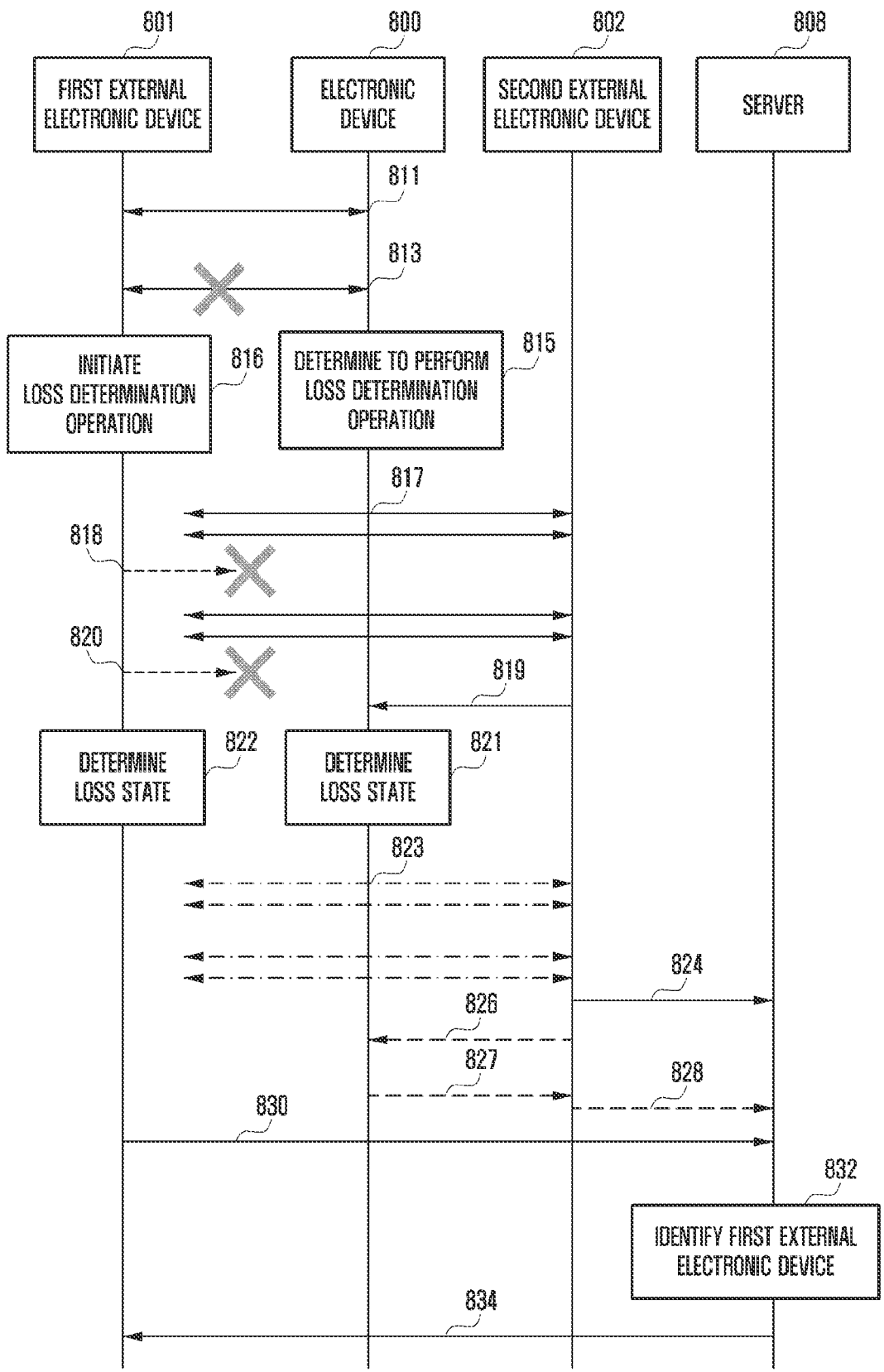
FIG. 8 is a signal flowchart for reporting a loss state of an electronic device according to various embodiments.

FIG. 8 is a signal flowchart for reporting a loss state of an electronic device 800 (e.g., the electronic device 200 in FIGS. 2 to 4) according to various embodiments.

According to various embodiments, the electronic device 800 may be a device that determines its own loss state, based on the communication state with a first external electronic device 801 (e.g., the first external electronic device 201 in FIGS. 2 to 4), and broadcasts a packet including loss notification information. For example, the electronic device 800 may include a portable electronic device (e.g., a smartphone or a tablet PC) or a wearable device (e.g., a wireless audio device, a smart watch, or a missing child prevention device) capable of short-distance wireless communication (e.g., Bluetooth or Bluetooth low energy (BLE)). For example, the electronic device 800 may include at least some elements identical or similar to those of the electronic device 101 shown in FIG. 1.

According to various embodiments, the first external electronic device 801 is a device related to the electronic device 800, and, for example, may transmit identification information of the electronic device 800 and its own identification information and to a server 808 (e.g., the server 208 in FIG. 2 or 4) to prove the relevance and obtain information for tracking the lost electronic device 800 through the server 808. For example, the first external electronic device 801 may include elements identical or similar to those of the electronic device 101 in FIG. 1. For example, the first external electronic device 801 may include a portable electronic device (e.g., a smartphone) having a communication function.

According to various embodiments, at least one second external electronic device 802 (e.g., the second external electronic device 202a and/or the second external electronic device 202b) may be a device that receives a packet broadcast from the lost electronic device 800 and transmits, to the server 808, identification information of the electronic device 800 together with its own location information. For example, the second external electronic devices 802 may include elements identical to or similar to those of the electronic device 101 in FIG. 1. For example, the second external electronic devices 802 may include a portable electronic device (e.g., a smartphone) capable of communication.

According to various embodiments, in operation 811, a processor (e.g., the processor 320 in FIG. 2) of the electronic device 800 may perform communication by transmitting and/or receiving a packet in a specified cycle or at the time when communication is required while the electronic device 800 is connected or is not connected to the first external electronic device 801.

According to various embodiments, the processor 320 may identify communication disconnection during communication with the first external electronic device 801 in operation 813. For example, if the connection with the first external electronic device 801 is interrupted while communicating with the first external electronic device 801, the processor 320 may determine that the communication is disconnected. For example, if the processor 320 does not receive a packet from the first external electronic device 801 for a specified time or more while performing communication in the state of not being connected with the first external electronic device 801, the processor 320 may determine that the communication is disconnected. For example, the processor 320 of the electronic device 800 may release a communication connection with the first external electronic device 801 in order to efficiently use limited radio resources. For example, if the electronic device 800 and the first external electronic device 801 are spaced a specified distance or more apart from each other, and/or if the quality of a signal received from the first external electronic device 801 is less than a specified value, a packet may not be received.

According to various embodiments, as the communication with the first external electronic device 801 is identified to be disconnected, the processor 320 may initiate an operation of determining whether or not the electronic device is lost in relation to the communication state with the first external electronic device 801 in operation 815. According to various embodiments, the time of performing the operation of determining whether or not the electronic device is lost may be determined based on various situations of the electronic device 800. For example, the time of performing the operation of determining whether or not the electronic device is lost may be determined based on a variety of information such as location information, time information, device characteristic information, and/or a communication environment of the electronic device 800.

According to various embodiments, the first external electronic device 801 may identify that communication is disconnected during communication with the electronic device 800 in operation 813, and may determine an operation of determining whether or not the electronic device 800 is lost in relation to the communication state with the electronic device 800 and, accordingly, wait to receive a packet for a specified period of time in operation 816.

According to various embodiments, as the operation of determining whether or not the electronic device is lost in relation to the communication state between the electronic device 800 and the first external electronic device 801 starts, the processor 320 may transmit an advertisement packet in a first attribute in operation 817. For example, the first attribute may include a scannable attribute. For example, the advertisement packet in the first attribute may include an advertisement packet (ADV_IND) including both a scannable attribute and a connectable attribute and/or an advertisement packet (ADV_SCAN_IND) including a scannable attribute and a non-connectable attribute. For example, the electronic device 800 may transmit the advertisement packet in the first attribute in a specified cycle for a specified period of time.

According to various embodiments, an operation cycle and/or time for determining whether or not the electronic device 800 is lost may be determined based on various situations of the electronic device 800. For example, various situations of the electronic device 800 may include a variety of information such as location information, time information, device characteristic information, and/or communication environment of the electronic device 800.

According to various embodiments, if the first external electronic device 801 receives the advertisement packet in the first attribute from the electronic device 800 during the operation time of determining whether or not the electronic device is lost, the first external electronic device 801 may transmit a scan request packet to the electronic device 800 in response thereto in operation 818 and/or operation 820.

According to various embodiments, the processor 320 may identify whether or not a scan request packet (e.g., operation 818 and/or operation 820) for the transmitted advertisement packet in the first attribute is received from the first external electronic device 801 during the operation time of determining whether or not the electronic device is lost. For example, the processor 320 may extract identification information (e.g., a device unique identifier or a device address) from a received scan request packet, compare the identification information with stored identification information of the first external electronic device 801, and, if they match, identify that the scan request packet has been received from the external electronic device 801.

According to an embodiment, the processor 320 may receive a scan request packet (e.g., operation 819) for the transmitted advertisement packet in the first attribute from the second external electronic device 802 during the operation time for determining whether or not the electronic device is lost. In this case, the processor 320 may extract identification information (e.g., a device unique identifier or a device address) from the received scan request packet, compare the identification information with stored identification information of the first external electronic device 801, and, if they do not match, identify that the scan request packet is not the packet received from the external electronic device 801.

According to various embodiments, the processor 320 may determine its loss state, based on a result of performing the operation of determining whether or not the electronic device is lost, in operation 821. For example, if a scan request packet is not received from the first external electronic device 801 during the operation time for determining whether or not the electronic device 800 is lost according to transmission of the advertisement packet in the first attribute, the electronic device 800 may determine a specified period of time after transmitting an advertisement packet in a first attribute, the electronic device 800 may determine that it is in the loss state. Meanwhile, if the advertisement packet in the first attribute is not received from the electronic device 800 during the operation time for determining whether or not the electronic device 800 is lost, the first external electronic device 801 may determine that the electronic device 800 is in the loss state in operation 822.

According to various embodiments, the processor 320 may transmit a packet including loss notification information in operation 823. For example, the packet including loss notification information may include an advertisement packet in a second attribute. As another example, the advertisement packet in the second attribute may include an advertisement packet including a broadcast attribute. For example, the broadcast attribute may include an attribute of transmitting a packet without specifying a receiving device. As another example, the advertisement packet in the second attribute may include an advertisement packet (ADV_IND) including a scannable attribute and a connectable attribute in addition to a broadcast attribute, an advertisement packet (ADV_NONCONN_IND) including a broadcast attribute, a non-connectable attribute, and an unscannable attribute, or an advertisement packet (ADV_SCAN_IND) including a broadcast attribute, a scannable attribute, and a non-connectable attribute.

According to various embodiments, transmission of the advertisement packet including loss notification information of the electronic device 800 may be determined based on various situations of the electronic device 800. For example, a transmission method including a transmission cycle of the advertisement packet including loss notification information of the electronic device 800 and/or a transmission signal strength range thereof may be determined based on various situations of the electronic device 800. For example, various situations of the electronic device 800 may include a variety of information such as current location information, time information, characteristic information, and/or communication environment of the electronic device 800.

According to various embodiments, the advertisement packet including loss notification information may include a variety of information such as identification information (e.g., a device unique identifier or a device address) of the electronic device 800, an address type, a local name of the electronic device 800, a transmission power level (Tx power level), or Bluetooth attribute information. For example, the loss notification information may include a lost indication flag indicating whether or not the electronic device is lost. For example, the loss notification information may include battery information of the electronic device 800 and/or information about the time of receiving the last packet (e.g., a scan request) from the first external electronic device 801. For example, the loss notification information may be included in a manufacturer-specific data field, which is an area that may be used arbitrarily by each manufacturer in a packet.

According to various embodiments, the electronic device 800 may transmit the advertisement packet including loss notification information and then switch to an inactive state until the next specified cycle. For example, in the inactive state, the processor 320 of the electronic device 800 may cut off power supplied to the main processor (e.g., the main processor 121 in FIG. 1) and operate using the power supplied to the auxiliary processor (e.g., the auxiliary processor 123 in FIG. 1) operating with low power.

According to various embodiments, the second external electronic device 802 may receive the advertisement packet in the second attribute broadcast from the lost electronic device 800 in operation 823. For example, the second external electronic device 802 may receive the advertisement packet in the second attribute broadcast from the lost electronic device 800, identify loss notification information, and transmit the identification information of the electronic device 800 and its own location information to the server 808 in operation 824. For example, the second external electronic device 802 may identify loss notification information included in the advertisement packet in the second attribute and transmit at least some of the loss notification information together with the identification information of the electronic device 800 and its own location information to the server 808.

According to various embodiments, the second external electronic device 802 receiving the advertisement packet in the second attribute (e.g., ADV_IND, ADV_NONCONN_IND, and/or ADV_SCAN_IND) may identify data for determining whether or not the electronic device is lost and upload the information of the discovered electronic device 800 to the server 808.

According to another embodiment, if the second external electronic device 802 receives a packet including a scan attribute, the second external electronic device 802 may further perform operation 826 to transmit a scan request to the electronic device 800, receive a response to the request from the electronic device 800 in operation 827, thereby obtaining additional data, and upload the obtained data to the server 808 in operation 828. For example, if the second external electronic device 802 receives a packet including a connectable attribute, the second external electronic device 802 may connect to the electronic device 800 and encrypt the discovery time, current time, location, and/or discoverer information, thereby configuring the same in the electronic device 800.

According to various embodiments, if the electronic device 800 is determined to be in the loss state in operation 822, the first external electronic device 801 may transmit related information of the electronic device 800 and the first external electronic device 801 to the server 808 in operation 830 in order to track the electronic device 800. For example, if the electronic device 800 is determined to be in the loss state, the first external electronic device 801, in order to track the electronic device 800, may transmit the identification information of the electronic device 800 together with its own identification information to the server 808 that provides a tracking service.

According to various embodiments, if the identification information of the electronic device 800 is received from the first external electronic device 801, and if the identification information of the electronic device 800 and the location information of at least one second external electronic device 802 are received from the second external electronic device 802, the server 808 may identify the first external electronic device 801 related to the electronic device 800, based on the identification information of the electronic device 800, in operation 832.

According to various embodiments, in operation 834, the server 808 may transmit, to the first external electronic device 801, location information of the second external electronic device 802 that transmitted the identification information of the electronic device 800, based on the identification information of the first external electronic device 801 and the electronic device 800.

According to an embodiment, the first external electronic device 801 may obtain location information of at least one second external electronic device 802 from the server 808, based on its own identification information and the identification information of the electronic device 800. For example, the first external electronic device 801 may transmit its own identification information and the identification information of the electronic device 800 to the server 808 in order to track the electronic device 800 and, based on this, receive location information of the second electronic device 802 transmitted together with the identification information of the electronic device 800 from the server 808. According to various embodiments, the user of the first external electronic device 801 may track the electronic device 800, based on the obtained location information of at least one second external electronic device 802.

According to various embodiments, an electronic device (e.g., the electronic device 200 in FIG. 2, 3, or 4) may include a communication circuit (e.g., the communication circuit 310 in FIG. 3), a memory (e.g., the memory 330 in FIG. 3), and a processor (e.g., the processor 320 in FIG. 3) operatively connected to the communication circuit and the memory, wherein the processor may be configured to transmit an advertisement packet in a first attribute through the communication circuit, identify, based on identification information stored in the memory, whether or not a scan request packet is received from an external electronic device (e.g., the first external electronic device 201 in FIG. 2, 3, or 4) corresponding to the identification information, and, if no scan request packet is received from the external electronic device, transmit an advertisement packet in a second attribute including loss notification information.

According to various embodiments, the first attribute may include a scannable attribute.

According to various embodiments, the processor may transmit the advertisement packet in the first attribute if communication established with the external electronic device is disconnected.

According to various embodiments, the processor may determine that the established communication is disconnected if the established communication is released or if no packet is received from the external electronic device for a specified period of time or more.

According to various embodiments, the processor may receive the identification information through the established communication from the external electronic device and store the same in the memory.

According to various embodiments, the second attribute may include a broadcast attribute of transmitting a packet without specifying a receiving device.

According to various embodiments, the loss notification information may include a lost indication flag indicating whether or not the electronic device is lost.

According to various embodiments, the loss notification information may further include at least one piece of battery information of the electronic device or time information of receiving the last packet from the external electronic device.

According to various embodiments, the loss notification information may be included in a manufacturer-specific data field of the advertisement packet in the second attribute.

According to various embodiments, the processor may determine at least one of a transmission cycle of the advertisement packet in the second attribute or a signal strength range thereof, based on at least one of current location information, time information, characteristic information, or a communication environment.

The embodiments disclosed in this document are only presented as examples to easily explain and assist in understanding technical content and are not intended to limit the scope of the disclosure of this document. Therefore, the scope of the disclosure of this document should be interpreted as including all changes or modifications derived based on the technical idea of various embodiments disclosed in this document, as well as the embodiments disclosed herein.

The invention claimed is:

1. An electronic device comprising:
   a communication circuit;
   memory; and
   a processor operatively connected to the communication circuit and the memory,
   wherein the processor is configured to:
   if connection between the electronic device and an external electronic device is released, transmit a first advertisement packet through the communication circuit;
   identify, based on identification information stored in the memory, whether a scan request packet corresponding to the first advertisement packet is received from the external electronic device; and
   if the scan request packet is not received from the external electronic device, broadcast a second advertisement packet, indicating that the electronic device is lost, through the communication circuit.

2. The electronic device of claim 1, wherein the determining that the connection between the electronic device and an external electronic device is released in comprises determining that no packet is received from the external electronic device for a specified period of time or more.

3. The electronic device of claim 1, wherein the first advertisement packet has a scannable attribute, and
   wherein the second advertisement packet has a broadcast attribute of transmitting a packet without specifying a receiving device.

4. The electronic device of claim 1, wherein loss notification information comprises a lost indication flag indicating whether or not the electronic device is lost, the loss notification information being included in the second advertisement packet.

5. The electronic device of claim 4, wherein the loss notification information further comprises at least one piece of battery information of the electronic device or and time information of receiving the a last packet from the external electronic device.

6. The electronic device of claim 4, wherein the loss notification information is included in a manufacturer-specific data field of the second advertisement packet.

7. The electronic device of claim 1, wherein based on at least one of current location information, time information, characteristic information, or a communication environment, the processor is configured to determine at least one of a transmission cycle of the second advertisement packet or and a signal strength range, based on at least one of current location information, time information, characteristic information, or a communication environment.

8. A method of an electronic device, the method comprising:
   if connection between the electronic device and an external electronic device is released, transmitting a first advertisement packet;
   identifying, based on identification information stored in a memory, whether a scan request packet corresponding to the first advertisement packet is received from the external electronic device; and
   if the scan request packet from the external electronic device is not received, broadcasting a second advertisement packet indicating that the electronic device is lost.

9. The method of claim 8, wherein the determining that the connection between the electronic device and an external electronic device is released comprises determining no packet is received from the external electronic device for a specified period of time or more.

10. The method of claim 9, wherein the first advertisement packet has a scannable attribute, and
wherein the second advertisement packet has comprises a broadcast attribute of transmitting a packet without specifying a receiving device.

11. The method of claim 9, wherein loss notification information comprises a lost indication flag indicating whether or not the electronic device is lost, and
at least one piece of battery information of the electronic device or and time information of receiving the a last packet from the external electronic device, the loss notification information being included in the second advertisement packet.

12. The method of claim 11, wherein the loss notification information is included in a manufacturer-specific data field of the second advertisement packet.

13. The method of claim 8, wherein the transmitting of the first advertisement packet comprises adjusting at least one of a transmission cycle of the second advertisement packet or a signal strength range thereof, based on at least one of current location information, time information, characteristic information, or a communication environment.

14. A method of determining a loss state of an electronic device, the method comprising:
establishing communication between the electronic device and a first external electronic device;
detecting disconnection of the communication between the electronic device and the first external electronic device;
if a first advertisement packet from the electronic device is not received, determining by the first external electronic device that the electronic device is lost,
if the first advertisement packet from the electronic device is received, transmitting a scan request packet from the first external electronic device to the electronic device; and
if a scan response packet corresponding to the scan request packet from the electronic device is not received, determining by the first external electronic device that the electronic device is lost.

15. The method of claim 14, further comprising transmitting to a server, by the first external electronic device, one or both of first identifying (ID) information identifying the first external electronic device and second ID identifying the electronic device.

16. The method of claim 15, further comprising obtaining, by the first external electronic device, first location information corresponding to at least one second external electronic device and second location information corresponding to the electronic device, based on one or both of the first ID information and the second ID information transmitted from the first external electronic device.

17. The method of claim 16, wherein the first location information and the second location information are obtained from the server.

* * * * *